(No Model.) 4 Sheets—Sheet 2.

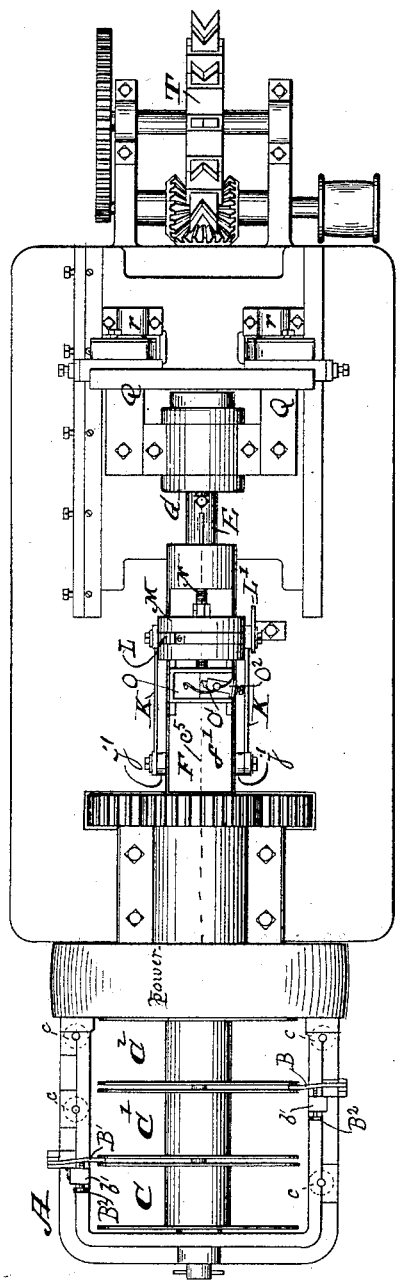

G. H. LASAR.
BARB WIRE MACHINE.

No. 327,277. Patented Sept. 29, 1885.

Attest:
Charles Pickles
W. J. Kesl.

Inventor:
Godfrey H. Lasar
by C. D. Moody
atty (No Model.) 4 Sheets—Sheet 3.

G. H. LASAR.
BARB WIRE MACHINE.

No. 327,277. Patented Sept. 29, 1885.

Attest:
Charles Pickles
W. J. Kes.

Inventor:
Godfrey H. Lasar
by C. D. Moody
atty (No Model.)
4 Sheets—Sheet 4.
G. H. LASAR.
BARB WIRE MACHINE.
No. 327,277. Patented Sept. 29, 1885.
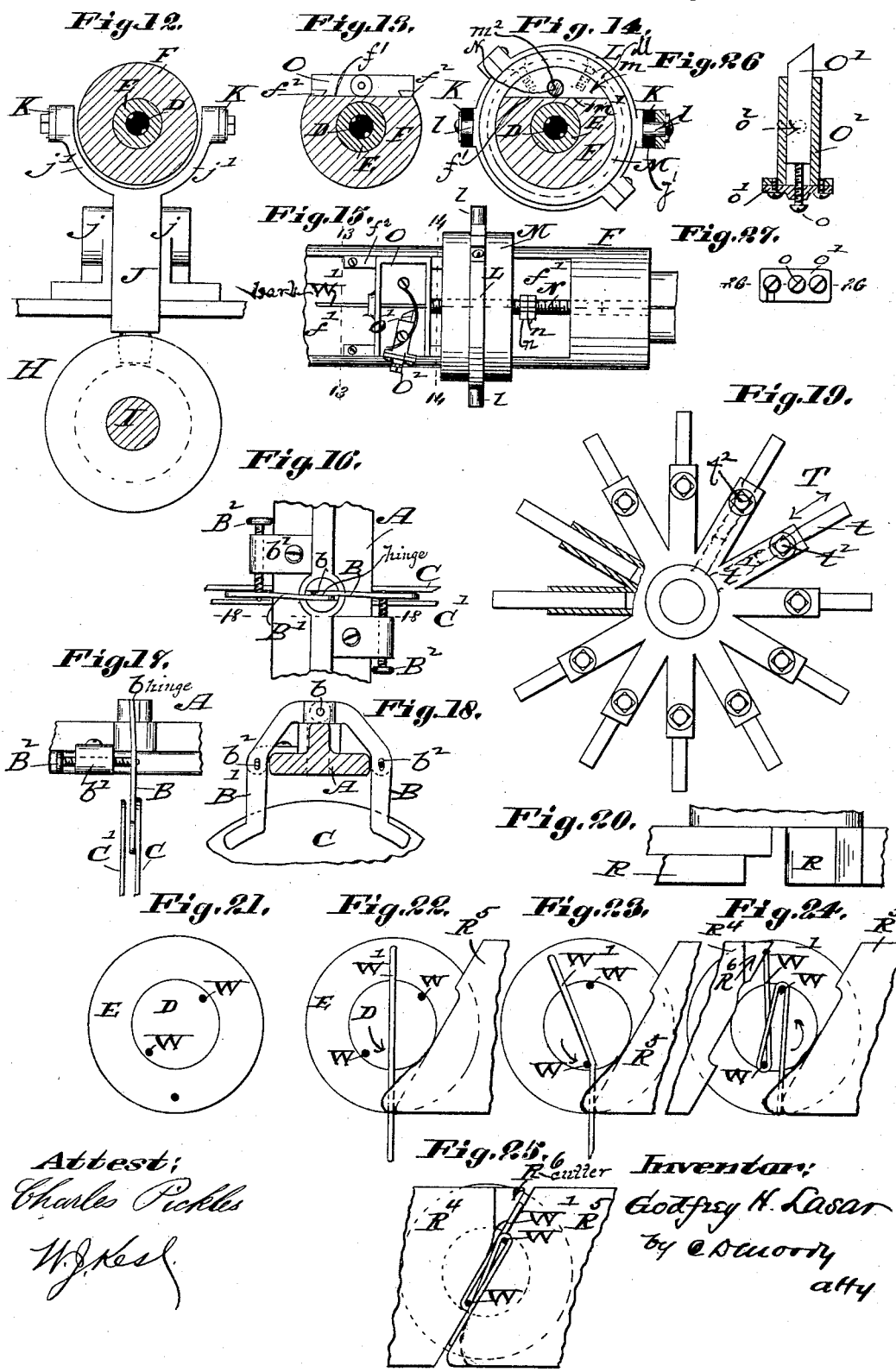
Attest:
Charles Pickles
W. J. Kesl
Inventor:
Godfrey H. Lasar
by C. Denorry
atty

UNITED STATES PATENT OFFICE.

GODFREY H. LASAR, OF ST. LOUIS, MISSOURI.

BARB-WIRE MACHINE.

SPECIFICATION forming part of Letters Patent No. 327,277, dated September 29, 1885.

Application filed December 18, 1883. (No model.)

*To all whom it may concern:*

Be it known that I, GODFREY H. LASAR, of St. Louis, Missouri, have made a new and useful Improvement in Barb-Wire Machines, of which the following is a full, clear, and exact description, reference being had to the annexed drawings, making part of this specification, in which—

Figure 3:
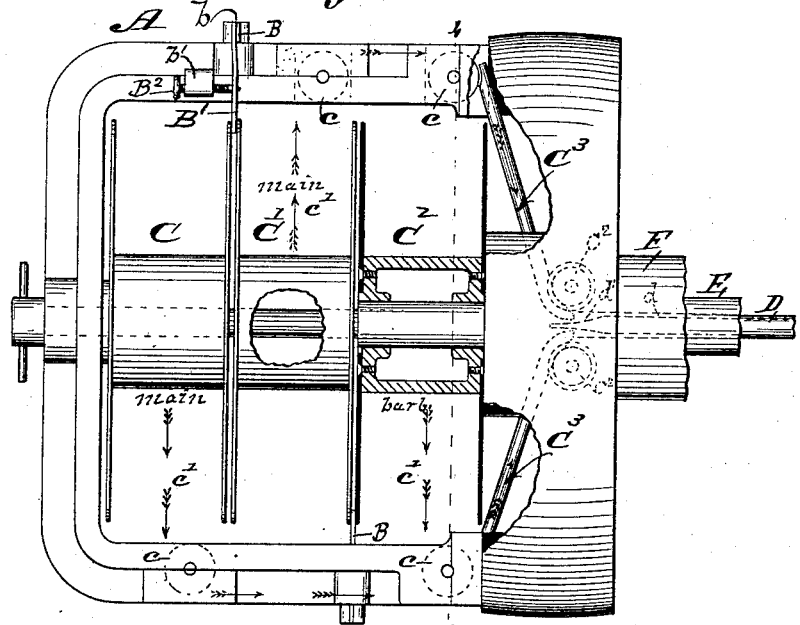
Figure 4:
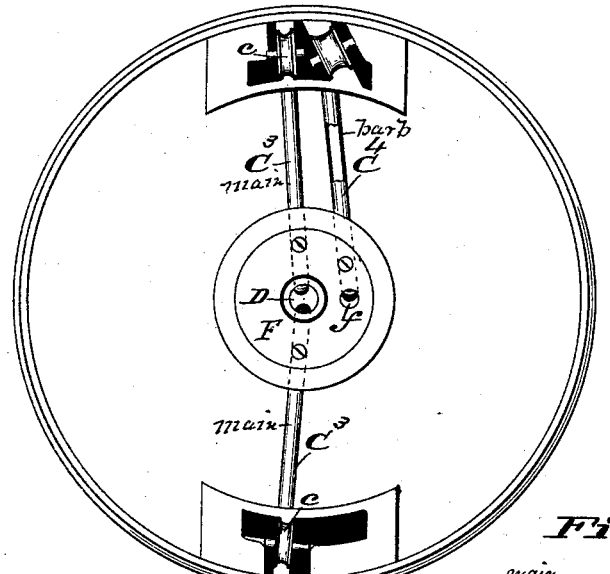
Figure 5:
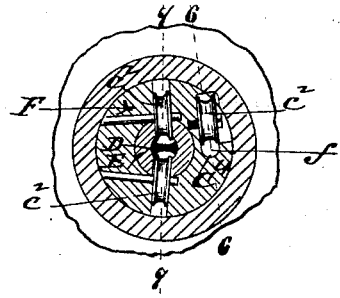
Figures 6, 7:
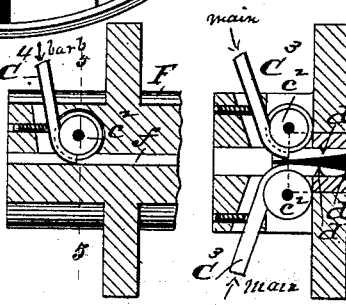
Figure 8:
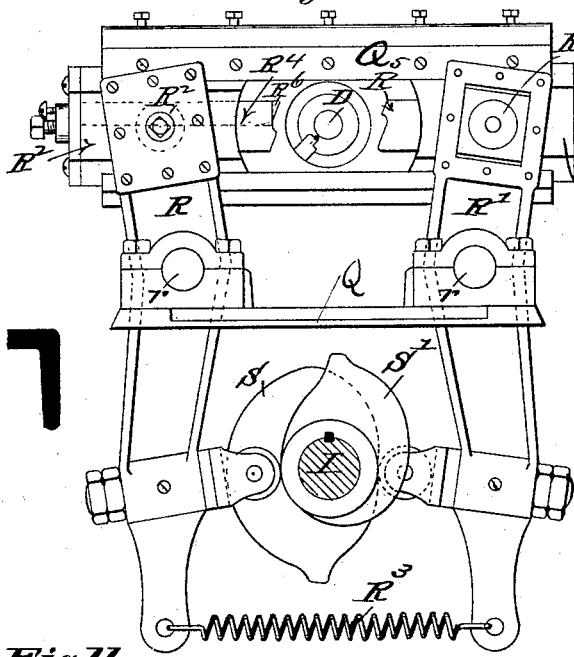
Figure 9:
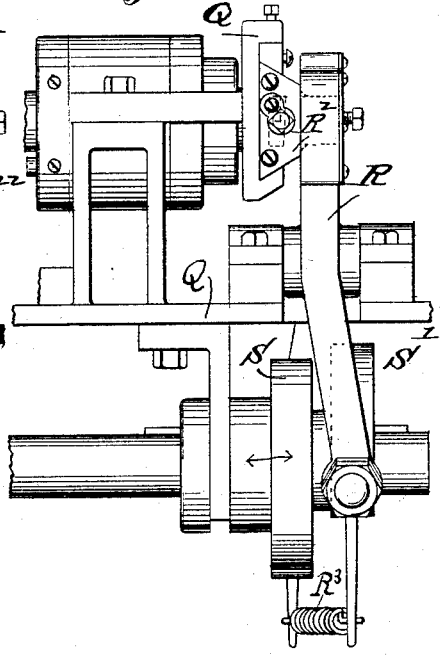
Figure 11:
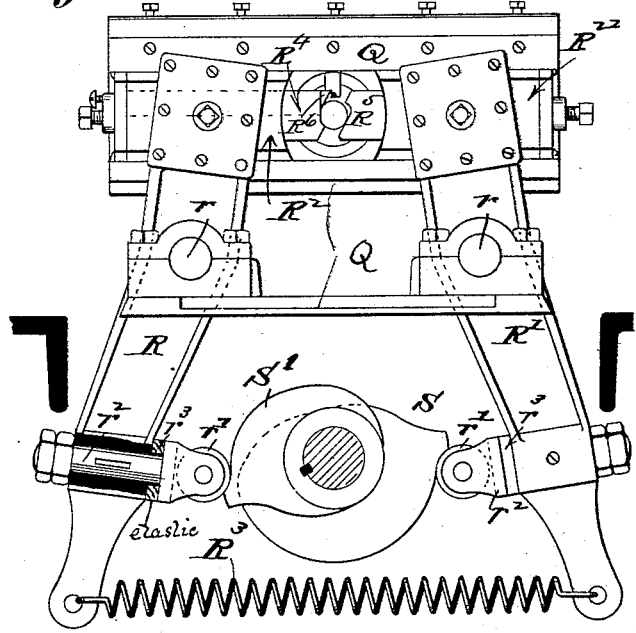
Figure 10:
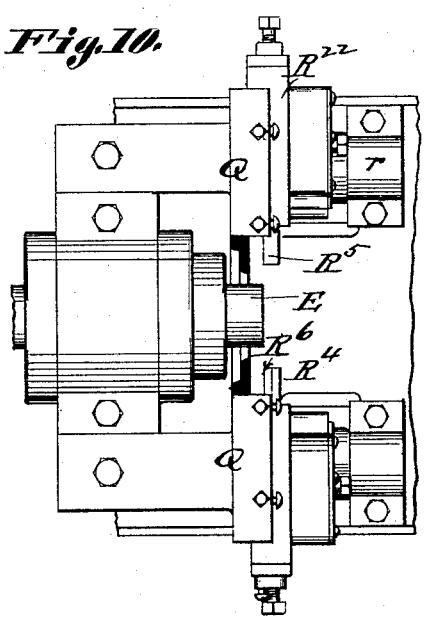

Figure 1 is a plan of the improved machine; Fig. 2, a side elevation, partly in section; Fig. 3, a plan, upon an enlarged scale and partly broken away and in section, of the flier and parts immediately therewith connected; Fig. 4, a cross-section on the line 4 4 of Fig. 3; Fig. 5, a section on the line 5 5 of Fig. 6; Fig. 6, a section on the line 6 6 of Fig. 5; Fig. 7, a section on the line 7 7 of Fig. 5. Fig. 8 is a front view, partly in section, of the barb-applying devices; Fig. 9, a side elevation of the parts shown in Fig. 8; Fig. 10, a plan of the last-named parts; Fig. 11, a view, partly in section, similar to that of Fig. 8, but showing the parts in a different position; and Figs. 12 to 25, details, Fig. 12 being a vertical cross-section on the line 12 12 of Fig. 2; Fig. 13, a section on the line 13 13 of Fig. 15; Fig. 14, a section on the line 14 14 of Fig. 15; Fig. 15, a top view of the barb-wire feed mechanism; Fig. 16, a side elevation of the tension device; Fig. 17, an edge elevation of the tension device; Fig. 18, a section on the line 18 18 of Fig. 16; Fig. 19, a side elevation of the guide-wheel; Fig. 20, a top view of the opposing ends of the compressors; Fig. 21, an end elevation of the core and barrel; Fig. 22, a similar elevation showing the barb-wire and the first position of one of the compressors; Fig. 23, the second relative position of the barbed wire and the compressor; Fig. 24, an elevation of the parts shown in Fig. 20, and showing the barb-wire intertwining upon the strand-wires and about to be severed; Fig. 25, a view showing the barb-wire severed and compressed upon the strand-wires; and Figs. 26 and 27 details.

The same letters of reference denote the same parts.

This invention relates, first, to the tension device; second, to the means for threading the machine; third, to the barb-wire feed mechanism; fourth, to the mode of operating the barb severing and compressing devices; and, fifth, to the guide-wheel.

The improved tension device is shown in Figs. 1 2 3, and upon an enlarged scale in Figs. 16, 17, and 18.

A represents the flier.

B B' represent arms pivoted at $b$ to the flier. They extend from the pivot inwardly to come between the spools C C' C$^2$. Each of these arms, by means of a set-screw, B$^2$, can be made to bear against the spool to which it belongs, and thereby exert more or less friction and retard the movement of the spool, according to the degree of tension it is desired to use—that is, the arm B, by means of its set-screw B$^2$, can be pressed sidewise against the side of the spool C, and the arm B', by means of its set-screw B$^2$, can be similarly pressed against the side of its spool. The set-screws B$^2$ each work through suitable lugs, $b'$, upon the flier, and the arms B B' are pivoted in such manner as to enable the free ends of the arms to be moved against the sides of the spools, as described, and to enable the arms to be operated as described the pivot $b$ is journaled in the flier, so as to permit of rotary movement therein. The arms B, &c., are slotted at $b^2$ to admit the points of the set-screws B$^2$. This holds the arms from flying out of place.

The threading mechanism is shown more distinctly in Figs. 3, 4, 5, 6, 7. The various wires pass from the spools C C' C$^2$, respectively, around sheaves $c c$, as indicated by the arrows $c'$ in Fig. 3. From the sheaves $c$ the wires pass through passages C$^3$—that is, each wire has a passage belonging to it. For instance, the wire from the spool C passes into the passage C$^3$. This passage is preferably a tube, such as shown. It extends from the region of the sheave $c$ inwardly to the central part of the flier, as shown in Fig. 7. The inner end of the tube C$^3$ terminates in the immediate vicinity of one, $d$, of the grooves in the core D, through which the wire passes to the farther end of the machine. The inner end of the passage or tube C$^3$ is curved, so as to direct the wire readily into the groove $d$. The core at $d'$ is beveled to facilitate the passing of the wire into the groove $d$. Each of the strand-wire passages or tubes C$^3$ is similarly extended and connects with its corresponding groove in the core D. The passage through which the barb-wire passes is similar in its general construction to that of the passages for the strand-wires; but it is arranged so as to cause the wire to be delivered near the outside of the stock F, which encircles the barrel E. To this end the tube $C^4$, which receives the barb-wire, leads from the outer edge of the flier inwardly to what may be termed the "stock" F of the machine. This is shown in Figs. 4, 5, 6. From the tube $C^4$ the wire passes through the passage $f$ in the stock F, and thence upon the outer side of the barrel, as indicated by the broken line $C^5$, Figs. 1 and 2. There are sheaves $c^2$ at the inner ends of all of the tubes $C^3$ and $C^4$.

To thread the machine it is only necessary to slip the wires into the tubes $C^3$ $C^4$, and thence into and through the grooves $d\ d$ and the passage $f$, respectively, and thence along the core through the machine.

The operation is very readily performed, and after the wires have been inserted in the passages, as described, they are out of the way, so as not to be interfered with.

The machine, so far as the construction of the core, barrel, stock, and the head G are concerned, resembles that described in a pending application of mine for a patent upon a barb-wire machine numbered serially 86,804, and filed March 2, 1883, to which reference is hereby made for a more thorough understanding thereof.

The strand-wires W W are fed through the machine in manner similar to that employed in the construction referred to. The barb-wire, as stated, is shown at W', Fig. 15. It is fed by means of the device shown in Figs. 1, 2, and more particularly in Figs. 12, 13, 14, 15.

H represents a cam upon the driving-shaft I. The cam operates the lever J, which at its lower end engages in the cam H, is pivoted at $j$, and above the pivot is forked at $j'\ j'$, and at the upper end of the forks it is jointed to the rods K K. The rods K K in turn are jointed by means of the journals $l\ l$ to a ring, L. This ring L, as seen more distinctly in Figs. 14, 15, is held in a groove in a band, M. This band, on its inner side, is provided with a projection, $m$, whose face $m'$ is flattened. The band encircles the stock F. The band is made to rotate with the stock, and also to be slipped, in a reciprocating manner, upon the stock. The stock is flattened at $f'$, and the projection $m$ of the band bears and slides upon the flattened part of the stock. The rotation of the driving-shaft, through the cam, the lever, and the rods described, causes the band M to be reciprocated longitudinally upon the stock F.

N represents a bolt which passes loosely through the perforation $m^2$ in the projection $m$, and on one side of the projection is threaded and provided with nuts $n$, and on the other side of the projection $m$ is attached to what may be termed the "housing" O. The housing is provided with a dog, O', which, when the housing is drawn forward, nips the barb-wire, and thereby causes it to be fed along through the machine. The housing is adapted to slide upon the guides $f^2$. The length of the barb is fixed by the position of the nuts $n$ upon the bolt N—that is, if it is desired to cut off a barbed length of wire equal to the throw of the band M, the nuts $n\ n$ are screwed up against the projection $m$ so as to bring the housing close against the side of the band M. The stroke of the housing O is then equal to the stroke of the band M; but when it is desired to cut off a barb-length of wire shorter than the throw of the band M the nuts $n\ n$ are unscrewed away from the projection $m$, and according to the distance which the nuts $n\ n$ are thus removed from the projection $m$ is the barb-length of wire shortened, for the band M does not begin to move the housing O until the projection $m$ encounters the nuts $n\ n$. The strand-wires and barb-wire are carried through the core D and the head G in the ordinary manner.

Q represents a slide extending transversely in the machine, as shown in Figs. 8, 9, 10, 11 more distinctly, and is adapted to be moved reciprocatingly in a longitudinal direction upon the bed-plate of the machine, as in other barb-wire machines.

R R' represent levers journaled at $r\ r$. At their upper ends they are journaled to blocks $R^2\ R^{22}$, which are adapted to be moved in the slide Q, and respectively from opposite sides toward and from the core D.

The driving-shaft I is provided with the cams S S', Figs. 8, 9, 11. The cams follow the slide in its movement, to which end they are arranged to slide longitudinally on the shaft I, but are prevented from rotating thereon by means of an ordinary spline on the shaft. The slide on its under side is supplied with a bracket which fits loosely into a grooved collar that is attached to the cams, as shown in Fig. 9. These parts are not lettered in the drawings, as their construction is familiar. These cams serve to open the lower ends of the levers R R' apart, and thereby cause the blocks $R^2\ R^{22}$ to be moved toward each other. The levers R R' are similarly provided with friction-rollers $r'\ r'$, which constitute the points of bearings of the levers upon the cams. A spring, $R^3$, serves to draw the lower ends of the levers R R' against the cams S S'.

The blocks $R^2\ R^{22}$ are respectively provided with the compressors $R^4\ R^5$. The block $R^2$ is also provided with the knife $R^6$. The movement of the compressors and knife are indicated in Figs. 8, 11, 22, 23, 24, 25. The cam S is shaped to move the lever R' so as to cause the compressor $R^5$ to come into the position shown in Fig. 22. The rotation of the core and head causes the barb to assume the form shown in Fig. 23. The other cam, S', now acts to move the other compressor and knife $R^6$, as shown in Fig. 24. The barb-wire is now severed, and the two compressors brought together and the barb compressed upon the strand-wires, as shown in Fig. 25.

The arms $r^2$, which pass through the levers

R R', respectively, and hold the rollers $r'$, are provided with elastic washers $r^3$, Fig. 11.

The barbed wire passes from the region of the compressors onto the guide-wheel T. This wheel is peculiarly constructed in this respect. Its arms $t$ are radially adjustable in the hub $t'$—that is, the arms $t$ can be set in or out in the hub, and at any desired point held therein by means of set-screws $t^2$, Fig. 19.

The standard L', Figs. 1, 2, keeps the ring L from turning around out of place. The dog O' is held in the holder $O^2$, Figs. 26, 27. By means of the screw $o$ the dog can be set farther out in the holder, and the screw $o^2$ holds the dog after it is adjusted. The plate $o'$ can be removed or swung aside and the dog removed from the holder.

I claim—

1. The combination of the ring L, the standard L', the band M, and the stock F, and means for reciprocating the band M on the stock F, and with reciprocating means for gripping and releasing the wire, substantially as and for the purpose set forth.

2. The combination, in a barb-wire machine, of the flier A, the arms B B', the spools C C', and the set-screws $B^2$, substantially as described.

3. The combination, in a barb-wire machine, of the flier A, the spools C C', the sheaves $c\ c^2$, and the passages $C^3\ C^3$, extending from the side of the flier to the stock at the center of the flier, substantially as shown and described.

4. The combination, in a barb-wire machine, of the flier A, the spools C C' $C^2$, the sheaves $c\ c^2$, and the passages $C^3\ C^3\ C^4$, said passages extending from the side of the flier inwardly to the stock at the center of the flier, as shown and described.

5. The combination, in a barb-wire machine, of the stock F, the flier A, the sheaves $c^2\ c^2$, the barrel E, the core D, having the grooves $d\ d$, beveled at $d'\ d'$, and the passages $C^3\ C^3$, as described.

6. The combination of the core D, having the grooves $d\ d$, beveled at $d'\ d'$, and the passages $C^3\ C^3$, as described.

7. The combination, in a barb-wire machine, of the stock F, having the passage $f$, with the passage $C^4$, and the stock A, substantially as described.

8. The combination, in a barb-wire machine, of the driving-shaft I, the cam J, the rods K K, the ring L, the barb M, and the stock F, together with the means for feeding the barb-wire, substantially as described.

9. The combination, in a barb-wire machine, of the stock F, flattened at $f'$, and the band M, having the projection $m$, as described, together with the means for feeding the barb-wire, substantially as described.

10. The combination, in a barb-wire machine, of the stock F, flattened at $f'$, the band M, having the projection $m$, and the housing O, as described, together with the dog O', and the bolt N, having the shoulders, substantially as described.

11. The combination, in a barb-wire machine, of the stock F, the band M, the bolt N, nuts $n\ n$, the housing O, and the dog O'.

12. The combination of the core D, the slide Q, the shaft I, the cams S S', the levers R R', the blocks $R^2\ R^{22}$, the spring $R^3$, and the compressors $R^4\ R^5$, as described.

13. The combination of the separate levers R R', journaled, respectively, at $r\ r$, the slide Q, the blocks $R^2\ R^{22}$, and the compressors $R^4\ R^5$, as described.

GODFREY H. LASAR.

Witnesses:
C. D. MOODY,
S. B. HAUTS.